United States Patent
Allasia et al.

(10) Patent No.: US 11,838,825 B2
(45) Date of Patent: Dec. 5, 2023

(54) METHOD AND SYSTEM FOR DELIVERING DEDICATED SERVICES RESTRICTED TO A PREDEFINED SERVICE AREA

(71) Applicant: TELECOM ITALIA S.p.A., Milan (IT)

(72) Inventors: Andrea Allasia, Turin (IT); Sergio Barberis, Turin (IT); Laura Colazzo, Turin (IT); Nicola Pio Magnani, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 171 days.

(21) Appl. No.: 17/288,615

(22) PCT Filed: Nov. 28, 2019

(86) PCT No.: PCT/EP2019/082972
§ 371 (c)(1),
(2) Date: Apr. 26, 2021

(87) PCT Pub. No.: WO2020/120159
PCT Pub. Date: Jun. 18, 2020

(65) Prior Publication Data
US 2021/0400425 A1     Dec. 23, 2021

(30) Foreign Application Priority Data

Dec. 14, 2018   (IT) .................. 102018000011108

(51) Int. Cl.
*H04W 4/021*   (2018.01)
*H04W 4/60*    (2018.01)
(Continued)

(52) U.S. Cl.
CPC ............ *H04W 4/021* (2013.01); *H04W 4/60* (2018.02); *H04W 12/06* (2013.01); *H04W 12/64* (2021.01); *H04W 12/72* (2021.01)

(58) Field of Classification Search
CPC ......... H04W 4/06; H04W 72/30; H04W 8/18; H04W 4/02; H04W 4/18; H04W 76/40;
(Continued)

(56) References Cited

U.S. PATENT DOCUMENTS 8,644,857 B2    2/2014  Chen et al.
2005/0261970 A1 * 11/2005  Vucina .................. G06Q 20/20
                                                705/16

(Continued)

OTHER PUBLICATIONS

International Search Report and Written Opinion dated Jan. 27, 2020 in PCT/EP2019/082972 filed Nov. 28, 2019.

*Primary Examiner* — Kwasi Karikari
(74) *Attorney, Agent, or Firm* — Oblon, McClelland, Maier & Neustadt, L.L.P.

(57) ABSTRACT

A method for delivering to a user a dedicated service restricted to a predefined service area includes, performing an access request to a dedicated service. The dedicated service is delivered from a server through a data network between a user device and the server. The method also includes determining a service profile associated with the user, and assigning to the user device a dedicated communication channel for the dedicated service. The method further includes starting a communication session with the server through the data network according to the assigned dedicated communication channel, and performing an authentication request to the server. If the service authenticates the user successfully, the position of the user is obtained, and the dedicated service is delivered to the user device.

12 Claims, 3 Drawing Sheets

Figure 1:
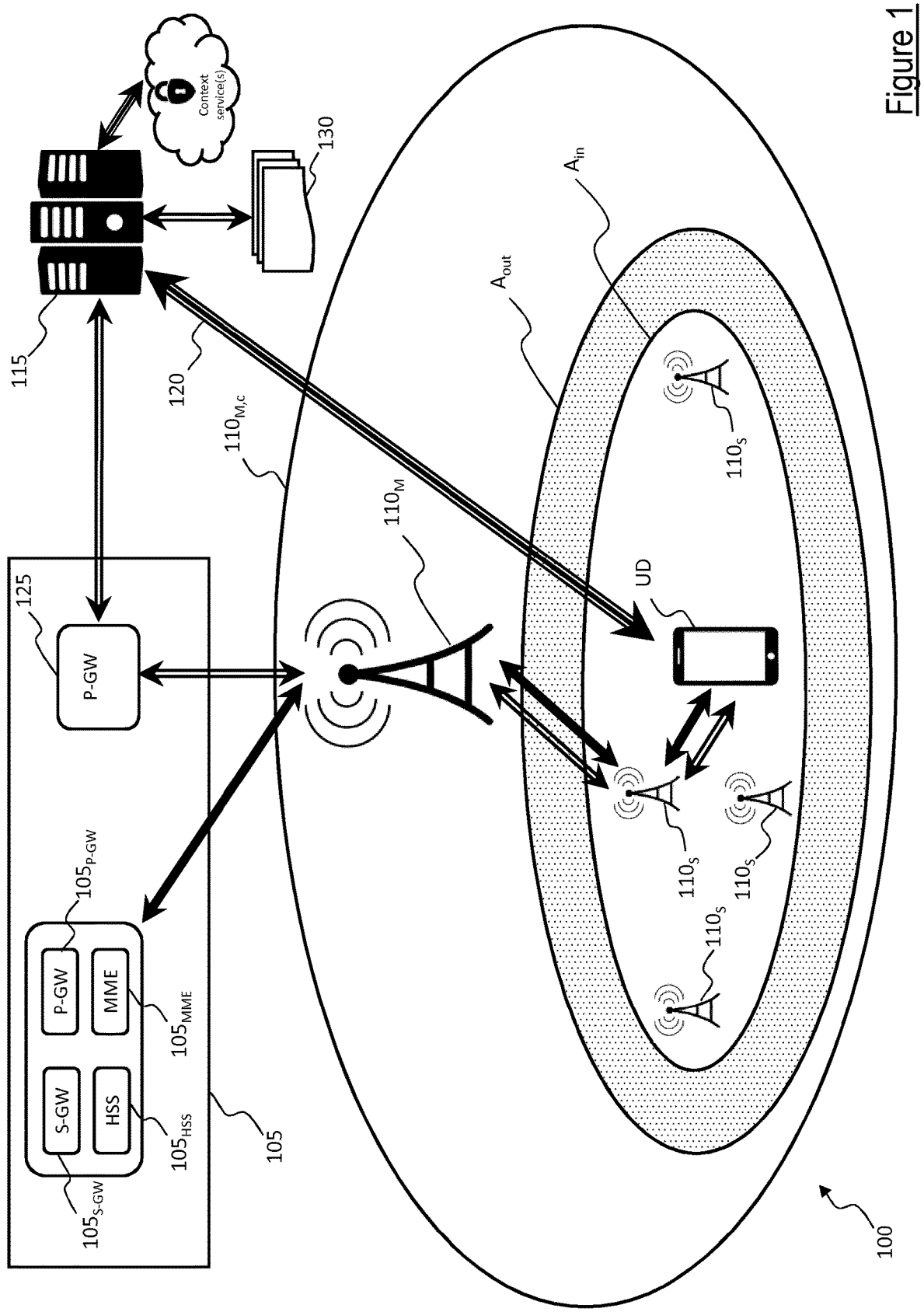

(51) Int. Cl.
*H04W 12/72* (2021.01)
*H04W 12/06* (2021.01)
*H04W 12/64* (2021.01)

(58) Field of Classification Search
CPC ....... H04W 28/18; H04W 88/16; H04W 4/24;
H04W 12/06; H04W 36/0007; H04W
12/082; H04W 28/24; H04W 12/08;
H04W 8/245; H04W 12/72; H04W
28/0226; H04W 4/025; H04W 28/20;
H04W 12/062; H04W 92/14
See application file for complete search history.

(56) References Cited

U.S. PATENT DOCUMENTS

| | | | |
|---|---|---|---|
| 2011/0039580 A1* | 2/2011 | Wigren | H04W 4/02 |
| | | | 455/456.1 |
| 2014/0086177 A1 | 3/2014 | Adjakple et al. | |
| 2017/0257886 A1 | 9/2017 | Adjakple et al. | |
| 2018/0295509 A1 | 10/2018 | Lee et al. | |
| 2020/0037217 A1* | 1/2020 | Shapiro | H04W 36/08 |

\* cited by examiner

METHOD AND SYSTEM FOR DELIVERING DEDICATED SERVICES RESTRICTED TO A PREDEFINED SERVICE AREA

BACKGROUND OF THE INVENTION

Field of the Invention

The present invention generally relates to a method and system for delivering dedicated services restricted to a predefined service area.

Overview of the Related Art

The delivery of dedicated services (in the following, context services) restricted or provided limitatively to a predefined service area including, for example, buildings or premises such as a university campus, an industrial site, a museum, a station or an airport (in the following, context area) encompasses different aspects such as radio coverage, provision of performance tailored to the context service and/or to user needs (where the users can be either or humans or not humans), identification of users having different access rights, and technological solutions to ensure coexistence of different context services sharing same network infrastructures.

Solutions are known in the art for the delivery of context services.

US20140373124 discloses a dual-use wireless network where the network may be used concurrently by the general public and by a managing agency (e.g., government or other agencies), but limited as deemed necessary in times of access restriction as determined by the managing agency, where network access may be denied to users/entities whose priority value is lower than the minimum allowed priority value set by the managing agency, or is not one of a set of allowed high priority access values or classes set by the managing agency.

U.S. Pat. No. 8,467,769 discloses a method for identifying a host-type radio communications network of a user terminal from at least two networks forming a radio communications infrastructure including a base station shared by the networks, and a network core for each of the networks.

J. S. Walia, "5G Micro-operators for the Future Campus: A Techno-economic Study" Proc. of Internet of Things Business Models, Users, and Networks, 2017, 23-24 Nov. 2017, Copenhagen, Denmark, discloses a deployment framework for future indoor small cell networks that will be beneficial for the venue owner/campus, micro-operator (uO), end-users and Mobile Network Operators (MNOs). The framework conceives an indoor small cell deployment for the campus, operated and managed by the uO, which leverages network slicing to provide the campus with local customized service, while at the same time also acting as a neutral host for participating MNOs.

US2012184294 discloses a system and method for enabling a mobile device to establish a local IP access on a packet data network connection on a femto cellular access network. A local server gateway and a macro server gateway are coupled to the femto cellular access network. A mobility management entity is coupled to the femto cellular access network, the local server gateway and the macro server gateway. The mobility management entity obtains a status mode of the mobile device and a location of the mobile device transmitted on the femto cellular access network. The mobility management entity selects one of the local server gateway and the macro server gateway based on the status mode of the mobile device and the location of the mobile device.

SUMMARY OF INVENTION

The Applicant has found that none of the solutions known in the art is satisfactory.

In particular, the Applicant has found that none of the above-cited solutions teaches how to easily and effectively identify users having access rights to a context service to be enjoyed in a context area, and to discriminate them from users having only access rights to general services (such as, for example, e-mailing, messaging, voice/video calls, internet browsing) that can instead be enjoyed anywhere according to a "Mobile Network Operator" (MNO) contract).

The Applicant has faced the above-mentioned issues, and has devised a method and system for delivering to users context services in a context area based on the access rights of the users to that context service and on their location with respect to the context area.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for delivering to a user a dedicated service restricted to a predefined service area. The dedicated service may be requested by a user device associated with the user through a core network of a wireless communication network in communication relationship with the user device, and may be delivered from a server through a data network between the user device and the server. The method preferably comprises:

at the user device side, performing an access request to the dedicated service;

at the core network side, determining a service profile associated with the user, and assigning to the user device a dedicated communication channel (for example, an IP address) for the dedicated service if, based on said service profile, the user is enabled to use the dedicated service;

at the user device side, starting a communication session with the server through the data network according to the assigned dedicated communication channel, and performing an authentication request to the server, and at the server side, during the communication session:

authenticating the user if a valid subscription of the user to the dedicated service exists;

if the user is authenticated, determining a position of the user with respect to the predefined service area, and delivering the dedicated service to the user conditioned to the fact that, based on the determined position, the user is located within the service area.

According to an embodiment of the present invention, the service area comprises a first and a second distinct service areas. Said delivering the dedicated service to the user preferably comprises:

if the user is located within the first area, fully delivering the dedicated service to the user by making available to the user all functionalities and options associated with the dedicated service; or if the user is located within the second area, partially delivering the dedicated service to the user by making available to the user only a subset of the functionalities and options associated with the dedicated service.

According to an embodiment of the present invention, said data network comprises a private data network, such as a Virtual Private Network.

According to an embodiment of the present invention, the method further comprises determining a geographic area to which the user device belongs. Said assigning to the user device a dedicated communication channel for the dedicated service is preferably carried out if the user is enabled to use the dedicated service and if, preferably, the service area is included in said geographic area.

According to an embodiment of the present invention, said determining a geographic area to which the user device belongs is based on a Tracking Area Code.

According to an embodiment of the present invention, said determining a service profile associated with the user comprises determining a service profile associated with a Subscriber Identity Module associated with the user device.

According to an embodiment of the present invention, said determining a position of the user with respect to the predefined service area is based on localization information identifying a geographic position of the user (for example, an absolute geographic position, e.g. in terms of latitude and longitude coordinates, or a relative geographic position, e.g. with respect to a coverage area of a network node of the wireless communication network that is serving the user device). The localization information is preferably obtained according to Cell ID based methods.

According to an embodiment of the present invention, said authenticating the user comprises checking access credentials accompanying the authentication request.

According to an embodiment of the present invention, the method further comprises, during said delivering the dedicated service to the user if the user is located within the service area:

updating the geographic position of the user;

according to the updated geographic position, updating the position of the user with respect to the predefined service area, and updating the communication session according to the updated position of the user with respect to the predefined service area.

According to an embodiment of the present invention, the method further comprises determining at least one quality information about the communication session, said updating the geographic position of the user being advantageously triggered by one or more threshold values of said at least one quality information.

According to an embodiment of the present invention, said at least one quality information about the communication session comprises a propagation delay or latency, the propagation delay or latency being preferably determined based on a measurement of a round-trip time for data packets sent to the user device from the server and echoed back to it.

According to an embodiment of the present invention, said performing an access request to the dedicated service is carried out over a dedicated Access Point Name being dedicated to the delivery of the dedicated service.

Another aspect of the present invention relates to a communication system for delivering a dedicated service to a user. The communication system may comprise:

a predefined service area to which the dedicated service is restricted;

a user device associated with the user, the dedicated service being requested by the user device;

a wireless communication network in communication relationship with the user device, the wireless communication network having a core network through which the dedicated service is requested by the user device;

a server for delivering the dedicated service to the user device, and a data network between the user device and the server, through which the dedicated service is delivered from the server to the user device.

The user device is preferably configured to perform an access request to the dedicated service.

The core network is preferably configured to determine a service profile associated with the user, and to assign to the user device a dedicated communication channel for the dedicated service if, based on said service profile, the user is enabled to use the dedicated service.

The user device is configured to start a communication session with the server through the data network according to the assigned dedicated communication channel, and preferably to perform an authentication request to the server.

The server is preferably configured to, during the communication session:

authenticate the user if a valid subscription of the user to the dedicated service exists;

if the user is authenticated, determine a position of the user with respect to the predefined service area, and delivery the dedicated service to the user conditioned to the fact that, based on the determined position, the user is located within the service area.

BRIEF DESCRIPTION OF THE ANNEXED DRAWINGS

Figure 2A:
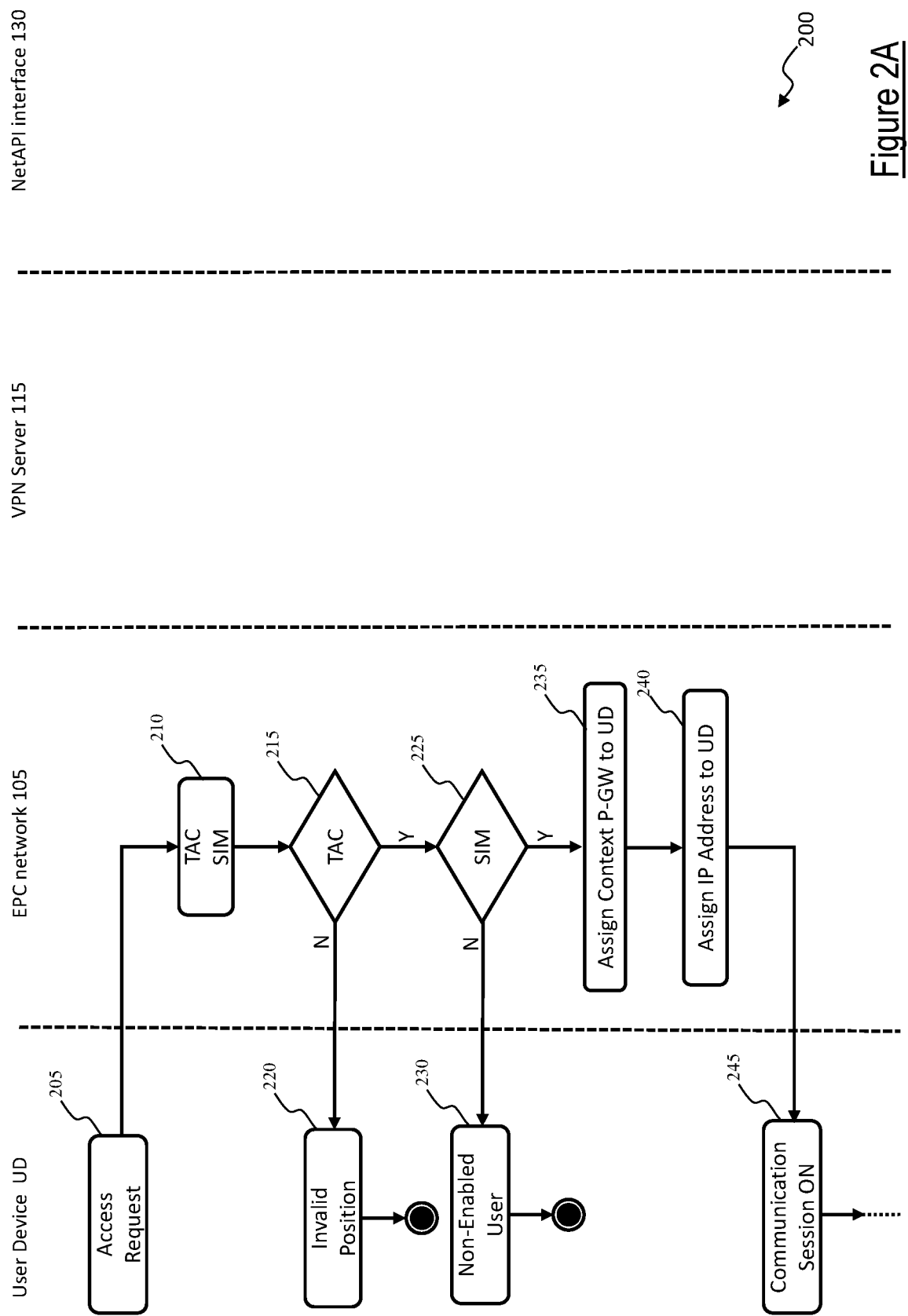
Figure 2B:
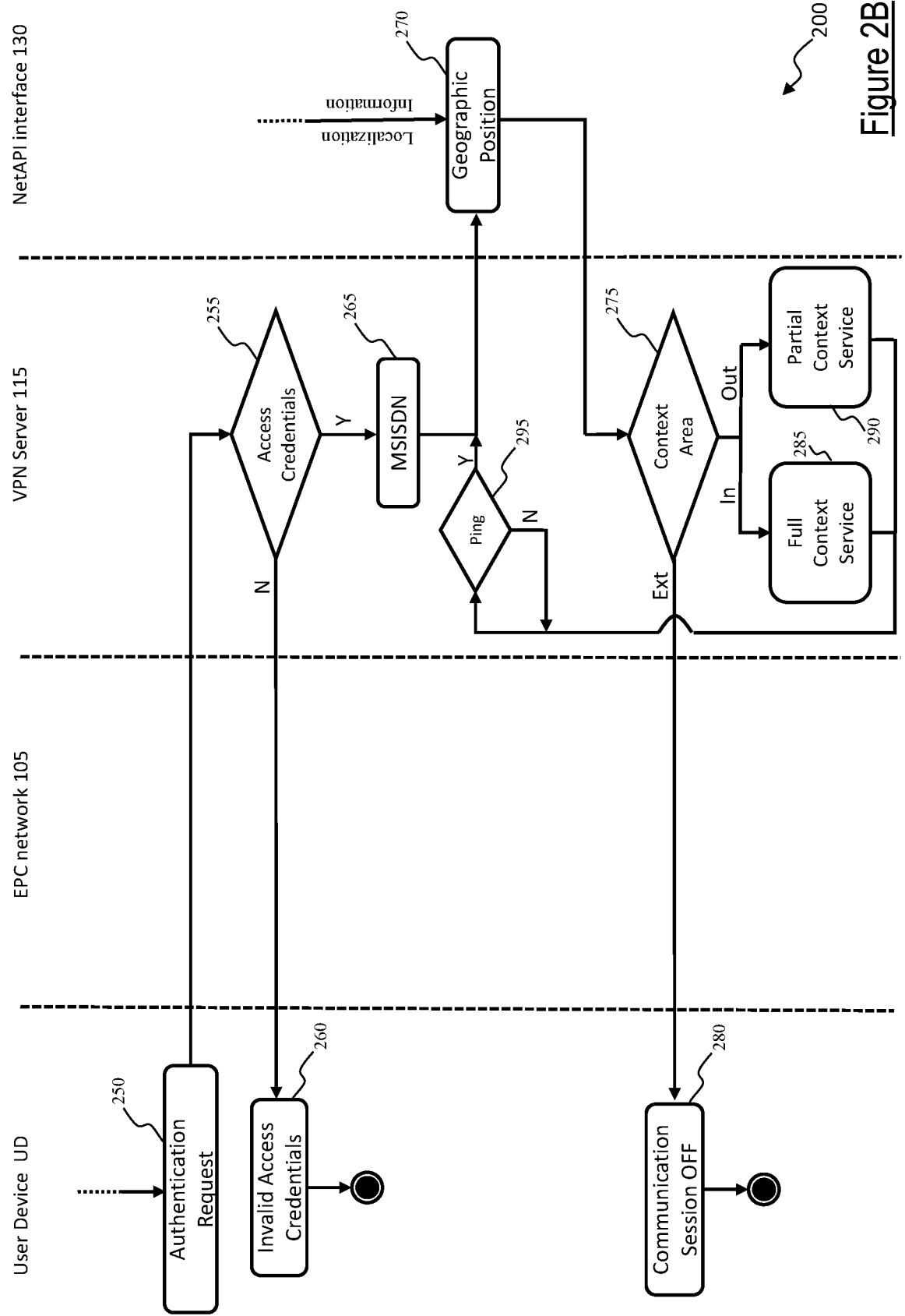

These and other features and advantages of the present invention will be made apparent by the following description of some exemplary and non-limitative embodiments thereof; for its better intelligibility, the following description should be read making reference to the attached drawings, wherein:

FIG. 1 shows a basic architecture of a communication system according to an embodiment of the present invention, and FIGS. 2A and 2B show a swimlane activity diagram of a procedure according to an embodiment of the present invention.

DETAILED DESCRIPTION OF PREFERRED EMBODIMENTS OF THE INVENTION

FIG. 1 shows a communication system 100, for example an Evolved Packet System (EPS) 100, according to an embodiment of the present invention. For the sake of completeness, FIG. 1 also shows, by means of interaction arrows, the interactions between the components of the communication system 100 and between the components of the communication system 100 and a user device UD external to the communication system 100 and connecting or connected thereto.

For the purposes of the present disclosure, the user device UD may be an electronic device providing (e.g., allowing or requiring) human interaction: in this respect, the user device UD may for example be a mobile phone, a smartphone, a wearable smart device (such as a smartwatch), a tablet, a personal digital assistant (PDA), or a laptop computer, or any other portable or mobile device having processing, input/output and memory units adapted to support different messaging protocols, such as "Short Message Service"

(SMS) texting, push notifications and the like, as well as to run software applications (e.g., mobile applications in the example at issue of a mobile device as user device UD). However, the principles of the present invention equivalently apply to user devices providing (e.g., allowing or requiring) no (or substantially no) human interaction (for example a surveillance camera, a sensor, or the like).

The user device UD is associated with a user, the user being for example the owner of the user device UD. In the example at issue of a mobile device as user device UD, the user device UD and the associated user are assumed to be in the same location/position, whereby in the following referred will be indifferently made to location/position of the user or to location/position of the user device UD.

For the purposes of the present disclosure, a context mobile application will be considered as mobile application run by the user device UD. By context mobile application it is herein meant a mobile application allowing the user to access (through his/her own user device UD) a dedicated service (hereinafter, context service) restricted (or provided limitatively) to that context area by connection to the communication system 100.

For the purposes of the present invention, a context service comprises a service that is delivered only in the context area.

The context service may for example comprise an improved or preferential or dedicated mode (fruition mode) of enjoying an already existing service (such as a general service, including for example e-mailing, messaging, voice/video calls and/or internet browsing, that can be enjoyed by the user anywhere according to a "Mobile Network Operator" (MNO) subscription contract, and hence according to the SIM module associated therewith). An example of dedicated fruition mode may be improved connection speed for enjoying voice/video calls and/or internet browsing with a better quality of experience.

Additionally or alternatively, the context service may for example comprise a tailored or specific or dedicated content (such as a dedicated information resource, including but not limiting to a dedicated image, a dedicated video and/or a dedicated virtual reality content). Just as an example, the dedicated content may be strongly linked to the context area (i.e., the dedicated content may specifically relate or pertain to that context area).

Alternatively, the context service may comprise a combination of the dedicated fruition mode and of the dedicated content (e.g., provided that a proper private network configuration is set).

According to the principles of the present invention, the context service can be used or accessed (e.g. at least partially, as better discussed in the following) only by users having access rights to that context service and being located in the corresponding context area.

According to an embodiment of the present invention, the access rights to a context service comprise, at least one (preferably both) between:

an enabling of the user to access that context service, e.g. based on a service profile associated with the user (preferably, with the SIM module installed in or associated with the respective user device UD). In the following, when necessary, users will be also distinguished between enabled users (i.e. users that, e.g. according to the service profile, are enabled by the network to use the context service), and non-enabled users (i.e. users that, e.g. according to the service profile, are not enabled to use the context service); and an authentication of the user for the context service, e.g. based on an existing or valid registration or subscription or enrollment to that context service. In the following, when necessary, users will be also distinguished between registered users (i.e. users having a valid registration or subscription or enrollment to the context service), and non-registered users (i.e., users having no or non-valid registration or subscription or enrollment to the context service).

Registration or subscription or enrollment to the context service may for example be performed by the user according to a guided procedure (e.g. including a registration form) run by the context mobile application (e.g., after installation thereof in the user device UD), or displayed on a web page associated with that context area.

As better discussed in the following, registered and non-registered users are discriminated, during a procedure for managing the access to the context service (hereinafter, context procedure), based on a check on access credentials associated with the users (the access credentials comprising, for example, account names and/or passwords assigned to or associated with the users upon their registration or subscription or enrollment to the context service). Just as an example, the access credentials may be input by a user in the context mobile application (e.g., during an access request to the context service by a requesting user), or they may be stored (preferably, in a cyphered manner) in the user device UD (for example, in a memory location of the user device UD, or in the SIM module thereof, or locally in the context mobile application) so as to be automatically retrieved for authentication when an access request to the context service or an authentication request for that context service takes place).

In the following, for the sake of conciseness, users that are both enabled users and registered users will be referred to as enabled/registered users, users that are both non-enabled users and non-registered users will be referred to as non-enabled/non-registered users, users that are enabled users and non-registered users will be referred to as enabled/non-registered users, and users that are non-enabled users and registered users will be referred to as non-enabled/registered users.

As mentioned above, a context service comprises a specific service that can be used or accessed (e.g. at least partially) only by enabled/registered users located in the corresponding context area.

Just as an example, the context area may comprise or delimit or enclose one or more point of interests; for the purposes of the present disclosure, a point of interest may comprise one or more buildings or premises, including (but not limited to) a university campus, an industrial site, a museum, a station or an airport.

According to an embodiment of the present invention, the context area comprises two or more distinct or separate (i.e., non-overlapping) areas. In the current example two areas are considered, namely a first $A_{in}$ and a second $A_{out}$ context areas, preferably adjacent to each other (the second context area $A_{out}$ being represented in the figure by a dotted pattern in order to differentiate it from the first context area $A_{in}$). In the example at issue, the second context area $A_{out}$ surrounds (e.g., completely surrounds) the first context area $A_{in}$, i.e. the first context area $A_{in}$ is at a first set of distances from the point of interest and the second context area $A_{out}$ is at a second set of distances from the point of interest higher than the first set of distances, whereby the first $A_{in}$ and second $A_{out}$ context areas will be referred to as inner $A_{in}$ and outer $A_{out}$ context areas in the following (when instead distinguishing between inner and outer area will not be relevant, they will be generically referred to as context area $A_{in},A_{out}$).

As better discussed in the following, enabled/registered users in (i.e., inside or within) the inner context area $A_{in}$ can fully use or access the respective context service (i.e., all functionalities and options associated with the context service are available to the enabled/registered users located in the inner context area $A_{in}$), enabled/registered users in (i.e., inside or within) the outer context area $A_{out}$ can only partially use or access the respective context service (i.e., only a suitable subset of the functionalities and options associated with the context service are available to the enabled/registered users located in the outer context area $A_{out}$), and enabled/registered users outside (i.e., at the external of) both the inner $A_{in}$ and outer $A_{out}$ context areas are prevented from using or accessing the respective context service (the non-enabled/non-registered users, the non-enabled/registered users, the enabled/non-registered users being instead prevented from using or accessing the context service regardless of their position with respect to the context area $A_{in},A_{out}$).

The inner $A_{in}$ and outer $A_{out}$ context areas are exemplarily represented in the figure as generically having same profiles, particularly substantially oval profiles; however, in a practical scenario, the inner $A_{in}$ and outer $A_{out}$ context areas may have any (regular or irregular) profile. Just as an example, the inner context area inner $A_{in}$ may have a profile substantially matching a perimeter of the respective point of interest, whereas the outer context area $A_{out}$ may have a profile compliant with a requirement of distance from the point of interest (or from a portion thereof), or from the inner context area $A_{in}$. Moreover, the inner Ain and outer $A_{out}$ context areas can also be separated from each other.

Any user is allowed to enjoy the general services regardless of his/her position with respect to the context area $A_{in},A_{out}$ (i.e., regardless of he/she is inside the inner context area $A_{in}$, or inside the outer context area $A_{out}$, or outside both the inner $A_{in}$ and outer $A_{out}$ context areas), whereas the enabled/registered user is allowed to enjoy the general services anywhere and, in addition, to access the context service provided in the context area $A_{in},A_{out}$ when he/she is located inside it and requests for it.

The communication system 100 is advantageously configured to allow access to both general and context services. In the following, for the sake of conciseness, only (hardware and/or software) components of the communication system 100 that are relevant for the understanding of the present invention will be shown and discussed.

The communication system 100 preferably comprises a core network. In the example at issue of EPS system as communication system, the core network is an IP-based core network, such as the core network of the LTE wireless communication system (or Evolved Packet Core, described in the 3GPP Technical Specification TS 23.002), and will be referred to as EPC network 105 in the following. For the purposes of the present disclosure, the EPC network 105 preferably comprises a conventional "Packet Data Network Gateway" (P-GW) module 105$_{P-GW}$ configured to route IP data packets to and from external network (not shown), thereby allowing the user to enjoy the general services.

The communication system 100 (e.g., compliant with the 3GPP LTE/LTE-Advanced standard) preferably comprises a number of relatively high-power and wide-coverage transceiver stations (hereinafter, macro nodes), such as the macro node 110$_M$, each one configured to provide radio coverage over a relatively wide geographic area (also referred to as macro cell), such as the illustrated macro cell 110$_{M,c}$ thereby allowing connection of the user device UD to the EPC network 105. Therefore, in the exemplary considered scenario, the macro node 110*m* act as serving network node for the user device UD.

In the exemplary considered embodiment, the communication system 100 preferably comprises a number of lower-power, smaller coverage nodes (e.g., pico, micro, and/or femto nodes), in the following referred to as small nodes, such as the small nodes 110$_S$, which are configured to provide, as a whole, radio coverage over a relatively small geographic area (also referred to as small cell) in order to allow connection of the user device UD to the EPC network 105 (e.g., directly or through the pertaining macro node 110$_M$). For the purposes of the present disclosure, the small nodes (preferably, indoor small nodes) are installed in the point of interest where the context service is intended to be provided, with the small cell defined by the small nodes 110$_S$ that advantgeously identifies the context area $A_{in},A_{out}$.

As mentioned above, a context service comprises a specific service that can be at least partially used or accessed by a user only when the user is an enabled/registered user that is located in the context area $A_{in},A_{out}$.

The user location may be evaluated based on one or more network trusted methodologies. By network trusted methodology it is herein meant that the evaluation of the user location is performed according to one or more network measurements (i.e., one or more measurements performed at network side), which are inherently reliable or trusted for a provider of the context service.

According to an embodiment of the present invention, the user location is based on at least one (preferably all) among the following network trusted methodologies:

a "Tracking Area Code" (hereinafter, TAC information), i.e. the unique code that each network operator assigns, during network deployment, to each group of neighbor network nodes and that allows determining a geographic area in which the user is located. As better discussed in the following, the TAC information can be advantageously used at an initial phase of the context procedure in order to assess whether the user is in geographic area to which the context area $A_{in},A_{out}$ belongs (so as to immediately exclude, without additional processing, requesting users that are certainly outside the context area $A_{in},A_{out}$);

localization information for identifying the geographic position of the user. Without losing generality, the localization information may for example comprise an absolute geographic position (i.e. a position of the user in terms of latitude and longitude coordinates), or a relative geographic position (i.e. a position of the user with respect to the macro cell 110$_{M,c}$ and/or with respect to the small nodes 110$_S$). Just as an example, the localization information may be obtained by exploiting Cell ID based methods, such as the enhanced Cell ID (E-CellID, or E-CID) positioning feature introduced in 3GPP release 9 (LTE)). In the exemplary considered embodiment, the localization information comprises the relative geographic position of the user and, as better discussed in the following, during the context procedure this localization information is advantageously used to evaluate or determine the absolute geographic position of the user (e.g., in terms of latitude and longitude coordinates); the absolute geographic position of the user is advantageously evaluated by means of MNO network functionalities of the MNO network infrastructure (better discussed in the following), and allows accurately determining the position of the user with respect to the context area $A_{in}, A_{out}$ (or, equivalently, the distance of the user with respect to the corresponding point of interest(s)). The determination of the position of the user with respect to the context area $A_{in}, A_{out}$ allows discriminating between users located in the context area $A_{in}, A_{out}$ and users located outside the context area $A_{in}, A_{out}$ thereby allowing or preventing the enabled/registered users to use or access the context service. More preferably, the determination of the position of the user with respect to the context area $A_{in}, A_{out}$ allows discriminating also between users located in the inner context area $A_{in}$, and users located outside the outer context area $A_{out}$ thereby allowing the enabled/registered users to use or access all the functionalities and options associated with the context service or only a subset thereof, respectively. Without losing generality, the localization information may generally comprise any network controlled localization information, any network independent localization information or any combination thereof;

quality information (or more thereof), such as propagation delay or latency. Just as an example, the propagation delay or latency may be determined based on ping or other software utility that allows measuring a round-trip time for messages sent to the user device UD from a source (in the considered embodiment from a VPN server, discussed below) and echoed back to the source. As better discussed in the following, the quality information can be advantageously used during the context procedure to infer that an enabled/registered user currently using or having accessed the context service may have moved to a different position (so as, for example, to trigger a new user location evaluation and possibly to update the functionalities and options of the context service to be made available to that enabled/registered user).

In alternative embodiments of the present invention the user location may be evaluated based on a combination of one or more network non-trusted methodologies (such as "Global Positioning System" (GPS) based methodologies and IP address based methodologies) with network trusted methodologies (such as the above mentioned network trusted methodologies or a subset thereof).

Preferably, as herein assumed, the enabled/registered user is notified about his/her location/position with respect to the context area $A_{in}, A_{out}$ (e.g., enabled/registered user located inside the inner context area $A_{in}$, or inside the outer context area $A_{out}$, or outside both the inner $A_{in}$ and outer $A_{out}$ context areas), and hence about the context service (and/or functionalities and options associated therewith) that can be accessed by the enabled/registered user. More preferably, the registered user is notified through a notification on the respective user device UD. Notification may for example be a push notification, for example a banner on the top the user device screen, a pop up bubble or badge from the button task bar, a dialog box that interrupts and blocks the view of the running context mobile application, and may contain text and/or image message (possibly with the further playing of an alert sound to attract the attention of the user). Notification (for example in form of SMS messages) may also reach the non-enabled/non-registered users, the enabled/non-registered users and the non-enabled/registered users, so as for example to encourage them to download the context mobile application, and/or to register and/or be enabled to the context service.

The communication system 100 preferably comprises a server 115 for providing the context service (the context service may be provided locally by the server 115 or by third parties, preferably trusted by the server 115). The context service is advantageously provided to the user device UD through a data network, preferably a private data network. According to an embodiment of the present invention, the context service is advantageously provided to the user device UD through a "Virtual Private Network" (hereinafter, VPN network) 120, reason why in the following the server 115 will be referred to as VPN server 115. The VPN network 120 is illustrated in the figure as a triple-line interaction arrow between the user device UD and the VPN server 115.

The VPN server 115 is advantageously configured to provide to the enabled/registered user access to the VPN network 120 (and, hence, to the context service provided or delivered by the VPN server 115). More advantageously, the VPN server 115 is advantageously configured to make available to the enabled/registered user all the functionalities and options associated with the context service, or only a suitable subset of the functionalities and options associated with the context service, or none of the functionalities and options associated with the context service according to whether the enabled/registered user is located in the inner context area $A_{in}$, in the outer context area $A_{out}$ or outside both the inner $A_{in}$ and outer $A_{out}$ context areas, respectively.

In order to achieve it, the VPN server 115 is preferably configured to evaluate and (e.g., periodically) update (e.g., during the delivery of the context service), preferably (although not necessarily) in the following order:

the localization information;

according to the localization information, the geographic position of the user (preferably, as mentioned above, by exploiting the MNO network functionalities of the MNO network infrastructure), and the position of the user with respect to the context area $A_{in}, A_{out}$ (or, otherwise stated, the context area $A_{in}, A_{out}$ to which the user belongs.

According to the adopted localization information and/or method, some of the steps of above may also be omitted or replaced.

The VPN server 115 is also advantageously configured to notify the user (e.g., through one or more messages or other notification means to the context mobile application installed in the user device UD) about user location variations and available services (for example, upon detection of user entering or exiting the inner context area $A_{in}$ and/or the outer context area $A_{out}$).

For the purposes of the present invention, the VPN server 115 preferably extends its basic functionalities providing also "Authentication, Authorization and Accounting" (AAA) services to authenticate the access credentials so as to authorize the enabled/registered users to access the context service. Just as an example, the VPN server 115 provides also AAA services based on "Federated Identity Management" (FIM) systems (including, but not limited to, "Security Assertion Markup Language" (SAML) and OpenID Connect (OIDC) standards). The AAA services may be provided locally by the VPN server 115 or by third parties (preferably trusted by the VPN server 115).

The communication system 100 preferably comprises a further "Packet Data Network Gateway" (P-GW) module 125, configured to route IP data packets to and from the VPN server 115, thereby allowing the enabled/registered user to use (i.e. at least partially, as discussed above) the context service. According to an embodiment of the present invention the P-GW module 125 is part of the EPC network 105 (as described in the 3GPP Technical Specification 23.002). The P-GW module 125 may for example be logically implemented as a dedicated functionality of the P-GW module $105_{P\text{-}GW}$ allowing connection of the user device UD to the external networks (e.g., for allowing the user to enjoy the general service(s)), or, as herein assumed and illustrated, a dedicated module physically separate and independent from it. Since the P-GW module 125 is specifically conceived for the provision or delivery of the context service, it will be referred to as context P-GW module 125 in the following.

The communication system 100 preferably comprises a conventional "Mobility Management Entity" (MME) module $105_{MME}$, a conventional Serving "Gateway" (S-GW) module $105_{S\text{-}GW}$, and a conventional "Home Subscriber Server" (HSS) module $105_{HSS}$, the MME module $105_{MME}$, the S-GW module $105_{S\text{-}GW}$ and the HSS module $105_{HSS}$ being preferably part of the EPC network 105.

For the purposes of the present disclosure, the MME module $105_{MME}$ is advantageously configured to receive the TAC information and, preferably by cooperation with the S-GW module $105_{S\text{-}GW}$ and/or the HSS module $105_{HSS}$, to retrieve an indication of the user device UD associated therewith and, hence, an indication of the service profile associated with the respective SIM module (so as to determine whether the requesting user is an enabled user or a non-enabled user, as better discussed in the following).

As visible in the figure, the communication system 100 preferably comprises an "Application Programming Interface" (API) (such as NetAPI interface) 130, for example an API exposed by the core network 105, providing the above mentioned MNO network functionalities of the MNO network infrastructure; for the purposes of the present disclosure, the NetAPI interface 130 allows determining (by cooperation with the VPN server 115) the geographic position of the user according to the localization information.

With reference now to FIGS. 2A and 2B, they show respective portions of a swim-lane activity diagram of the context procedure 200 according to an embodiment of the present invention. For the purposes of the present disclosure, the relevant entities involved in the authorization procedure 200 comprise (or mainly comprise) the user device UD, the EPC network 105, the VPN server 115 and the NetAPI interface 130.

The context procedure 200 starts at action node 205, wherein a requesting user sends an access request (i.e. network attach followed by VPN access request) to reach a context service provided in the context area $A_{in}, A_{out}$.

According to an embodiment of the present invention, this is achieved by running the context mobile application installed in the user device UD. The access request may for example be a manual access request (i.e. an access request actively triggered by the user through voluntary or manual selection of a corresponding command), or a passive access request (i.e., an access request automatically triggered by the context mobile application upon launching thereof).

Just as an example, the manual access request may for example be triggered by active selection or touch by the user of an access request virtual key displayed on a home screen of the context mobile application, or by active selection or input by the user of a proper "Access Point Name" (APN) on a setting section of the context mobile application (the selected APN being for example a dedicated APN, i.e. an APN dedicated to the provision or delivery of the context service and being to this purpose associated with the context P-GW module 125).

According to the exemplary considered embodiment, the access request comprises an exchange of signalling between the user device UD and the EPC network 105 (preferably, at least the MME module $105_{MME}$ thereof), the signalling exchange preferably allowing the EPC network 105 to retrieve/receive the TAC information (or other similar information about a geographic area or region in which the user is located) and information about the SIM module associated with the user device UD (such as service profile associated with the SIM module)—action node 210.

Then, decision node 215, a check is preferably performed for assessing whether the user is in a geographic area to which the context area $A_{in}, A_{out}$ belongs. In the negative case, exit branch N of the decision node 215, which means that the requesting users is certainly outside the context area $A_{in}, A_{out}$ (or, otherwise stated, the requesting user is in an invalid position for the use of the context service), a corresponding error message or notification is preferably displayed on the user device UD (action node 220), whereupon the context procedure 200 preferably ends.

Back to decision node 215, if instead the user is assessed to be in a geographic area to which the context area $A_{in}, A_{out}$ belongs (exit branch Y of the decision node 215), a further check is preferably performed (decision node 225) in order to assess whether the requesting user is enabled to use the context service (i.e., whether the requesting user is an enabled user), preferably based on the service profile associated with the SIM module. In the negative case, exit branch N of the decision node 225, which means that the requesting users is a non-enabled user (or, otherwise stated, the requesting user is not enabled to use the context service), a corresponding error message or notification is preferably displayed on the user device UD (action node 230), whereupon the context procedure 200 preferably ends. However, in embodiments of the present invention (not shown), upon reception of the error message or notification, the context mobile application may advantageously suggest or ask or allow the user (e.g. through a dedicated dialog box associated with the error message or notification) to send a service profile update request to the MNO operator in order to be enabled to the requested context service.

As should be understood, in alternative embodiments of the present invention (not shown), the checks at the decision nodes 215 and 225 may be carried out in different order, and/or at least one of them may take place in a different phase of the context procedure (e.g. after an authentication phase, discussed here below, of the context procedure 200). Moreover, the check at decision node 215 may also be omitted in basic implementations of the present invention.

Back to decision node 225, if instead the user is assessed to be an enabled user (exit branch Y of the decision node 225), then a dedicated communication channel is assigned to the user device UD (action nodes 235, 240) to allow communication with the VPN server 115 for the context service. In the preferred embodiment herein considered, this is achieved by association, preferably by the EPC network 105, of the context P-GW module 125 with the user device UD (or, equivalently, with the requesting enabled user) (action node 235), and by assignment, preferably by the context P-GW module 125, of the dedicated IP address to the user device UD (action node 240).

By communication channel it is herein broadly meant the physical or logical link that connects (or identifies a connection between) a data source and a data sink for their communication. In the exemplary considered embodiment, an "Internet Protocol" (IP) address is assumed as communication channel (and, hence, a dedicated IP address is assumed as dedicated communication channel). In any case, other communication channels may also be provided additionally or alternatively to the IP address.

The signalling exchange taking place at nodes 205-240 (and essentially pertaining to the request of the dedicated service by the user) involves the user device UD, the small nodes $110_S$, the macro node $110_M$ and the EPC network 105 (particularly, the MME $105_{MME}$, P-GW $105_{P-GW}$, S-GW $105_{S-GW}$, and/or HSS $105_{HSS}$ modules thereof), and is conceptually represented in FIG. 1 by bold-line interaction arrows between them; these bold-line interaction arrows have been purposely differentiated from the double-line interaction arrows in the same figure, which are instead meant to conceptually represent signalling exchange between the components involved in the authentication and in the position checks (i.e., the checks on the geographic position of the user and on the position of the user with respect to the context area), and from the triple-line interaction arrow in the same figure, which is instead meant to conceptually represent the signalling exchange between the components involved in the context service delivery/fruition.

Back to the context procedure 200, based on a proper network virtualization protocol (such as SSL/TLS tunneling, etc.) a communication session (hereinafter referred to as VPN communication session) between the user device UD and the VPN server 115 is started according to (i.e., over or through) the assigned dedicated IP address (action node 245), whereupon the user device UD preferably sends an authentication request to the VPN server 115 (action node 250).

For the purposes of the present invention, the authentication request comprises the access credentials (e.g. the account name and password, or digital certificate, or federated identity assigned to or associated with the user upon its registration or subscription or enrollment to the context service through the AAA service) and allows the user to be recognized as a registered user (in the example at issue, an enabled/registered user), who is thus permitted to access or use the context service, or as a non-registered user (in the example at issue, an enabled/non-registered user), who is thus prevented from accessing or using the context service (as discussed here below).

As mentioned above, the access credentials may be input by the user in the context mobile application or they may be automatically retrieved by the context mobile application (e.g., when they are securely stored in the user device UD) either during the access request (in which case the access credentials are already available when the authentication request is sent to the VPN server 115) or contextually to the authentication request (in which case the authentication request may for example be triggered by the input of the access credentials or, conversely, the retrieval of the stored access credentials may for example be triggered by the authentication request).

Upon reception of the authentication request (and of the accompanying access credentials), a check (decision node 255) is preferably performed at the VPN server 115 (preferably by exploiting AAA services implemented therein) in order to authenticate or invalidate the access credentials and, hence, assessing whether the requesting user (i.e., the requesting enabled user) is a registered user (i.e., an enabled/registered user) or a non-registered user (i.e., an enabled/non-registered user).

If, exit branch N of the decision node 255, the access credentials are invalidated (i.e., not authenticated or invalid), which means that the requesting user has no valid registration or subscription or enrollment to the requested context service, a corresponding error message or notification is preferably displayed on the user device UD (action node 260), whereupon the context procedure 200 preferably ends. However, in embodiments of the present invention (not shown), upon reception of the error message or notification, the context mobile application may advantageously suggest or ask or allow the user (e.g. through a dedicated dialog box associated with the error message or notification) to send to the VPN server 115 (or other module of the communication system 100) a registration or subscription or enrollment request or a registration or subscription or enrollment update request in order to respectively be registered to the requested context service or to restore an expired registration or subscription or enrollment (e.g., upon payment of a corresponding context service fee and/or upon updating personal or contact information of the user).

Back to the decision node 255, if the access credentials are authenticated (i.e., valid or validated), which means that the requesting user has a valid registration or subscription or enrollment to the requested context service (exit branch Y of the decision node 255), the requesting user (who, at this point, is assessed to be an enabled/registered user) is authorized to access the requested context service, thereafter the geographic position of the user (e.g., in terms of latitude and longitude coordinates, possibly also altitude) is evaluated (see action nodes 265 and 270 discussed here below) so as to determine the position of the user with respect to the context area (see decision node 275 and action nodes 285 and 290).

In the preferred embodiment herein considered, upon authentication of the access credentials, the VPN server 115 is configured to determine or retrieve a user subscription identifier, and preferably to send it (or to make it available) to the NetAPI interface 130 (action node 265). Just as an example, the user subscription identifier comprises a "Mobile Station International Subscriber Directory Number" (MSISDN) associated with the user device UD (particularly, with the SIM module thereof) and defined, for example, in ITU-T recommendation E.164.

Upon reception of the MSISDN, the NetAPI interface 130 is advantageously configured to determine, preferably based on the localization information identifying the position of the user within the macro-cell $110_{M,c}$ (and for example obtained by exploiting Cell ID based methods), the geographic position of the user (e.g., the absolute geographic position in terms of latitude and longitude coordinates, possibly also altitude)—action node 270—whereby the VPN server 115 is configured to evaluate the position of the user with respect to the context area $A_{out}, A_{in}$ (or, equivalently, the distance of the user from the point(s) of interest associated with the context area $A_{out}, A_{in}$) (decision node 275).

If, based on the geographic position of the user, the VPN server 115 assesses that the user is located outside the context area $A_{in}, A_{out}$ (i.e., outside both the inner $A_{in}$ and outer $A_{out}$ context areas)—see exit branch "Ext" of the decision node 275—the enabled/registered user is prevented from using or accessing the context service at all, whereupon the VPN communication session between the user device UD and the VPN server 115 is preferably ended (action node 280) and the context procedure 200 preferably ends (with a corresponding error message or notification that may advantageously be displayed on the user device UD); otherwise, the enabled/registered user is allowed to use or access the context service (or, equivalently, the VPN server 115 delivers the context service to the enabled/registered user).

In the example at issue in which the context area where the context service is provided or delivered comprises two distinct context areas (i.e., the inner $A_{in}$ and outer $A_{out}$ context areas), the VPN server 115 is preferably configured to discriminate also if the user is located in the inner context area $A_{in}$ or in the outer context area $A_{out}$.

Preferably, as mentioned above, if the VPN server 115 assesses that the user is located in (i.e., within or inside) the inner context area $A_{in}$ (exit branch "In" of the decision node 275), the VPN server 115 is advantageously configured to fully deliver the context service to the enabled/registered user by making available to the user all the functionalities and options associated with the context service (and a corresponding message or notification may be preferably displayed on the user device UD). In order to achieve it, the VPN server 115 may be configured to accordingly set one or more parameters of the VPN communication session (for example, by confirming or updating the dedicated IP address to the user device UD or by changing routing rules or IP network masks)—action node 285.

If instead the VPN server 115 assesses that the user is located in the outer context area $A_{out}$ (exit branch "Out" of the decision node 275), the VPN server 115 is advantageously configured to partially deliver the context service to the enabled/registered user by making available to the user only a subset of the functionalities and options associated with the context service (and a corresponding message or notification may be preferably displayed on the user device UD). In order to achieve it, the VPN server 115 may be configured to accordingly set one or more parameters of the VPN communication session (by confirming or updating the dedicated IP address to the user device UD or by changing routing rules or IP network masks)—action node 290.

As visible in the figure, the context procedure 200 advantageously provides for checking, during the fruition of the context service by the user, whether the enabled/registered user currently using or having accessed the context service may have moved to a different position. This is preferably achieved by (e.g., periodically) updating the geographic position of the user (and, hence, the position or distance of the user with respect to the point(s) of interest in, or associated with, the context area $A_{in}, A_{out}$) and by accordingly updating the VPN communication session, with the updating of the geographic position of the user that can be performed either periodically (e.g., based on predefined timings) or aperiodically; according to the preferred embodiment herein considered, the updating of the geographic position of the user is advantageously triggered (hence, aperiodically) by one or more threshold values of one or more quality information about the VPN network 120 (such as propagation delay or latency).

Particularly, in the preferred embodiment herein considered, the VPN server 115 is configured to determine (e.g., periodically) the propagation delay or latency based on the round-trip time of messages (e.g., Internet Control Message Protocol (ICMP) echo data packets) sent to the user device UD from the VPN server 115 and echoed back to it, and to compare it to a predetermined threshold latency value.

For example, if (exit branch Y of decision node 295) the VPN server 115 measures a latency value in ping response above the predetermined threshold latency value, a new evaluation or updating of the geographic position of the user takes place (action node 270) and the context procedure 200 goes on as such at nodes 275-290. Therefore, if the enabled/registered user currently using or having accessed the full context service has moved from the inner context area $A_{in}$ to the outer context area $A_{out}$ or outside the context area $A_{in}, A_{out}$, he/she is subsequently downgraded to the partial context service or no context service, respectively; similarly, if the enabled/registered user currently using or having accessed the partial context service has moved from the outer context area $A_{in}$ to the inner context area $A_{in}$ or outside the context area $A_{in}, A_{out}$, he is subsequently upgraded to the full context service or downgraded to no context service, respectively.

If instead (exit branch N of the decision node 295) the VPN server 115 measures a latency value in ping response below the predetermined threshold latency value, no actions are preferably taken (at least until new latency measures are available for that user device UD)—this is conceptually represented in the figure by loop connection between the exit branch N of the decision node 295 and the input branch thereof—and the user keeps on using the context service without changes.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the system has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although in the foregoing explicit reference has been exemplarily made to a communication system 100 compliant with the 3GPP LTE/LTE-Advanced standard, the principles of the present invention may be equivalently applied to other communication systems/networks/standards. In particular, the principles of the present invention may be equivalently applied to the forthcoming 5G communication network and replace at least partially some of its native advanced features.

The invention claimed is:

1. A method for delivering to a user a dedicated service restricted to a predefined service area, the dedicated service being requested by a user device associated with the user through a core network of a wireless communication network in communication relationship with the user device, and delivered from a server through a data network between the user device and the server, the method comprising:

at the user device side, performing an access request to the dedicated service;

at the core network side,
- determining a geographic area to which the user device belongs,
- determining a service profile associated with the user, and
- assigning to the user device a dedicated communication channel for the dedicated service if, based on said service profile, the user is enabled to use the dedicated service and if the predefined service area is included in said geographic area;

at the user device side,
- starting a communication session with the server through the data network according to the assigned dedicated communication channel, and
- performing an authentication request to the server, and at the server side, during the communication session:
- authenticating the user if a valid subscription of the user to the dedicated service exists;
- if the user is authenticated, determining a position of the user with respect to the predefined service area, and
- delivering the dedicated service to the user conditioned to the fact that, based on the determined position, the user is located within the predefined service area.

2. The method according to claim 1, wherein the predefined service area comprises a first and a second distinct service areas, said delivering the dedicated service to the user comprising:
- if the user is located within the first area, fully delivering the dedicated service to the user by making available to the user all functionalities and options associated with the dedicated service; or
- if the user is located within the second area, partially delivering the dedicated service to the user by making available to the user only a subset of the functionalities and options associated with the dedicated service.

3. The method according to claim 1, wherein said data network comprises a private data network, such as a Virtual Private Network.

4. The method according to claim 1, wherein said determining a geographic area to which the user device belongs is based on a Tracking Area Code.

5. The method according to claim 1, wherein said determining a service profile associated with the user comprises determining a service profile associated with a Subscriber Identity Module associated with the user device.

6. The method according to any claim 1, wherein said determining a position of the user with respect to the predefined service area is based on localization information identifying a geographic position of the user, the localization information being preferably obtained according to Cell ID based methods.

7. The method according to claim 1, wherein said authenticating the user comprises checking access credentials accompanying the authentication request.

8. The method according to claim 1, further comprising, during said delivering the dedicated service to the user if the user is located within the predefined service area:
- updating the geographic position of the user;
- according to the updated geographic position, updating the position of the user with respect to the predefined service area, and
- updating the communication session according to the updated position of the user with respect to the predefined service area.

9. The method according to claim 8, further comprising determining at least one quality information about the communication session, said updating the geographic position of the user being triggered by one or more threshold values of said at least one quality information.

10. The method according to claim 9, wherein said at least one quality information about the communication session comprises a propagation delay or latency, the propagation delay or latency being preferably determined based on a measurement of a round-trip time for data packets sent to the user device from the server and echoed back to it.

11. The method according to claim 1, wherein said performing an access request to the dedicated service is carried out over a dedicated Access Point Name being dedicated to the delivery of the dedicated service.

12. A communication system for delivering a dedicated service to a user in a predefined service area to which the dedicated service is restricted, the communication system comprising:
- a user device associated with the user, the dedicated service being requested by the user device;
- a wireless communication network in communication relationship with the user device, the wireless communication network having a core network through which the dedicated service is requested by the user device;
- a server configured to deliver the dedicated service to the user device; and
- a data network between the user device and the server, through which the dedicated service is delivered from the server to the user device, wherein:

the user device is configured to perform an access request to the dedicated service;

the core network is configured to:
- determining a geographic area to which the user device belongs,
- determine a service profile associated with the user, and
- assign to the user device a dedicated communication channel for the dedicated service if, based on said service profile, the user is enabled to use the dedicated service and if the predefined service area is included in said geographic area;

the user device is configured to:
- start a communication session with the server through the data network according to the assigned dedicated communication channel, and
- perform an authentication request to the server, and the server is configured to, during the communication session:
- authenticate the user if a valid subscription of the user to the dedicated service exists;
- if the user is authenticated, determine a position of the user with respect to the predefined service area, and
- deliver the dedicated service to the user conditioned to the fact that, based on the determined position, the user is located within the service area.

* * * * *